(No Model.)
G. MATHIAS.
HAT.
No. 561,413.
Patented June 2, 1896.
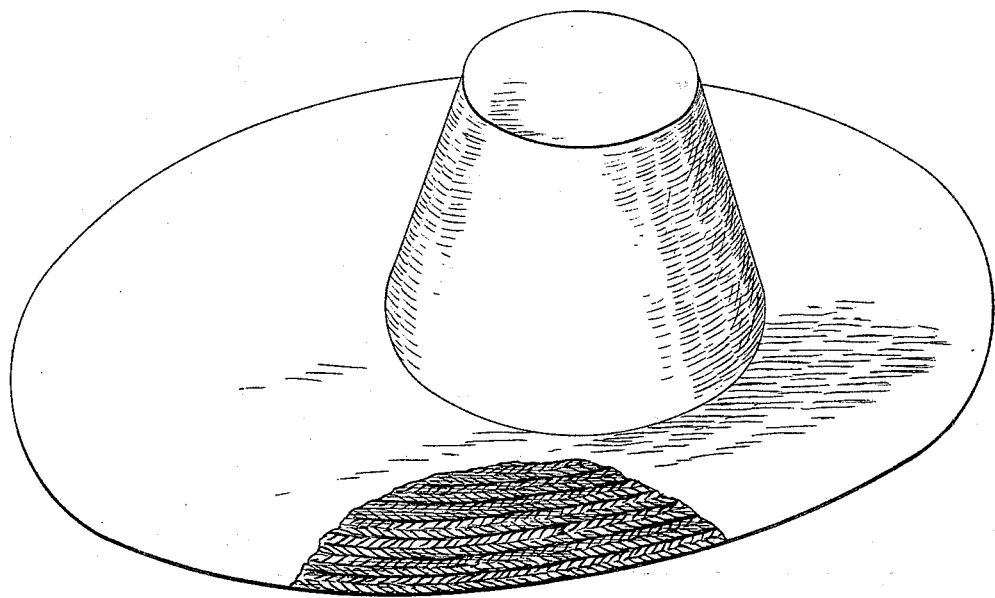
Witnesses.
Geo. W. Rea
Robt. Emmett
Inventor.
Georges Mathias.
By James L. Norris.
Atty.

UNITED STATES PATENT OFFICE.

GEORGES MATHIAS, OF PARIS, FRANCE, ASSIGNOR TO FREDERICK JOHN ELLIOTT, OF LONDON, ENGLAND.

HAT.

SPECIFICATION forming part of Letters Patent No. 561,413, dated June 2, 1896.

Application filed June 10, 1895. Serial No. 552,329. (No specimens.) Patented in France October 22, 1894, No. 242,274, and in England November 29, 1894, No. 23,200.

*To all whom it may concern:*

Be it known that I, GEORGES MATHIAS, a citizen of the Republic of France, and a resident of 15 Rue Thévenot, Paris, France, have invented a certain new and useful Improved Manufacture of Impermeable Hats in Imitation of Leghorn and Straw, (for which I have obtained a patent in Great Britain, No. 23,200, bearing date November 29, 1894; also in France, No. 242,274, bearing date October 22, 1884,) of which the following is a specification.

Imitation straw and leghorn hats, worn by ladies and children generally and by gentlemen in summer only, are usually made of fine wood-chips, woven or plaited, such hats being known in the trade as "chip hats." They are dyed to the desired color, then pressed, and afterward varnished by a spirit varnish to preserve them temporarily from the action of the weather and rain. Such hats in a short time, however, lose their shape, the crowns and bodies crack and split, and the brim becomes supple.

Now the object of this invention is to prepare hats in imitation of straw and leghorn by employing a stiff linen fabric, such as buckram, shaping it on a dummy, then coating it with a composition inside and out, next waterproofing the composition, then submitting the hat to hydraulic pressure in molds etched with straw or leghorn pattern or in cast molds, securing a wire in the edge of the brim, and finally surface coloring and glossing with powdered brimstone. Hats thus made retain their shape while in wear, they are not inclined to crack or split, are exceedingly light in weight, are weatherproof and waterproof, and there is no tendency for the brim to separate from the body. As an addition, the edge of the brim by the inclosure of a wire or cane is kept sufficiently stiff, and if accidentally bent can easily be caused to resume its shape.

A hat made according to my invention is illustrated by the accompanying drawing, in which the figure is a perspective view of the hat.

It will of course be understood that the form or shape of hat indicated in the drawing is only typical of many different forms or shapes which may be given to it.

To carry my invention into practice, I employ a stiff fabric—say buckram—which I cut and make up approximately to the desired contour of a hat. The "shape" is then coated on both sides with gilders' size, gelatin, or other glutinous body, with which is mixed a suitable quantity of kaolin, zinc-white, or the like, forming a compound, to which a yellow tint can be given by a suitable color, (earthy or other.) The shape thus coated is then subjected to hydraulic, water-bag, or other powerful press to give the imprint of the mold or molds previously prepared to the pattern of plaited straw or leghorn. The shape can be further pressed to smooth down any irregularities, and be afterward subjected to treatment by paraffin in benzene or their equivalents. The shape can then be heated in a stove or vessel and afterward exposed for the volatile spirit to pass away. The edge wire or cane can be arranged in an overlap in the edge of the brim and sewed in place to enable said brim to be stiffened and to retain its shape. The hat thus made is rubbed over with powdered brimstone to give it a finish.

The finishing of the hat with brimstone or sulfur is accomplished as follows: Very finely pulverized sulfur is employed for this operation, which is applied to the hat with a hand-brush by strongly brushing with this brush, which is impregnated with the powdered or pulverized sulfur, and the amount of gloss imparted to the hat will depend upon the energy of the brushing. To carry out this operation, which is done by hand, the hat is placed on a plaster or other mold exactly corresponding to the hat-shape, so that the impregnated brush may be pressed firmly without spoiling the shape or damaging the hat. The sulfur is taken up by simply dipping the hard brush into the powdered sulfur, which adheres of itself to the bristles of the brush. When the hat has been thus brushed for several minutes and it is judged to have taken up sufficient gloss or finish, the excess of sulfur powder, which has not adhered to the hat, is brushed off with a soft brush or feather-head duster.

The brimstone or sulfur finishing step of my invention is important, in that it imparts a gloss and finish and gives brilliancy and color to the hat, and, furthermore, it enables me to make the hat what it is intended to be—namely, imitation straw. In this state the hat is finished and ready for delivery.

Benzene has been mentioned, but spirits of wine, methylated spirit, benzol, toluol, xylol, cumol, essence of turpentine, or other available spirit will answer, and although paraffin is referred to, any kind of animal wax or vegetable wax can be substituted.

I am aware that it has heretofore been proposed to manufacture hats, bonnets, and other head coverings from material which is coated and embossed in imitation of straw, and such, therefore, I do not broadly claim.

What I claim, and desire to secure by Letters Patent, is—

The process or method herein described of manufacturing imitation straw and leghorn hats, which consists in blocking a textile fabric into the shape of a hat, coating this fabric with a glutinous compound, pressing the coated fabric and imparting thereto the desired pattern of plaited straw or leghorn, impregnating the exterior of the molded fabric with a waterproofing compound, and finally glossing the exterior surface of the molded fabric with powdered brimstone or sulfur, substantially as set forth.

In witness whereof I have hereto signed my name, in the presence of two subscribing witnesses, this 17th day of May, 1895.

GEORGES MATHIAS.

Witnesses:
 JEAN HENS,
 PAUL MONTAUD.